United States Patent [19]
Yonemitsu

[11] Patent Number: 5,191,436
[45] Date of Patent: Mar. 2, 1993

[54] METHOD FOR RECORDING CODED MOTION PICTURE DATA

[75] Inventor: Jun Yonemitsu, Kanagawa, Japan
[73] Assignee: Sony Corporation, Tokyo, Japan
[21] Appl. No.: 693,707
[22] Filed: Apr. 30, 1991
[30] Foreign Application Priority Data
 May 9, 1990 [JP] Japan .................. 2-119604
[51] Int. Cl.⁵ .............................................. H04N 5/76
[52] U.S. Cl. .................................... 358/335; 358/311; 358/313; 360/14.1
[58] Field of Search ................ 358/335, 342, 310, 311, 358/313, 133, 136, 135; 360/13, 14.1, 33.1, 35.1

[56] References Cited

U.S. PATENT DOCUMENTS

| | | | |
|---|---|---|---|
| 4,942,465 | 7/1990 | Ohta | 358/133 |
| 4,942,476 | 7/1990 | Koga et al. | 358/335 |
| 5,079,630 | 1/1992 | Golin et al. | 358/133 |
| 5,140,437 | 8/1992 | Yonemitsu et al. | 358/342 |

Primary Examiner—Tommy P. Chin
Assistant Examiner—Robert Chevalier
Attorney, Agent, or Firm—Alvin Sinderbrand; William S. Frommer

[57] ABSTRACT

Coded moving picture data is recorded in groups of frames, each frame representing a video image frame and each group being formed of intraframe, interframe and interpolated frame coded data signals. Typically, at least one interpolated frame coded data is derived, in part, from a video image frame that is represented in a preceding group of frames. If a recorded group of frames is edited, said at least one interpolated frame coded data in the edited group of frames no longer is related to the preceding group of frames on the record medium and, similarly, the interpolated frame coded data in the group of frames that immediately follows the edited group of frames no longer is related to the recorded group of frames which precedes it. Accordingly, an edit flag is set in the edited group of frames and/or in the immediately following group of frames to apprise decoding circuitry not to decode the said at least one interpolated frame coded data.

10 Claims, 18 Drawing Sheets

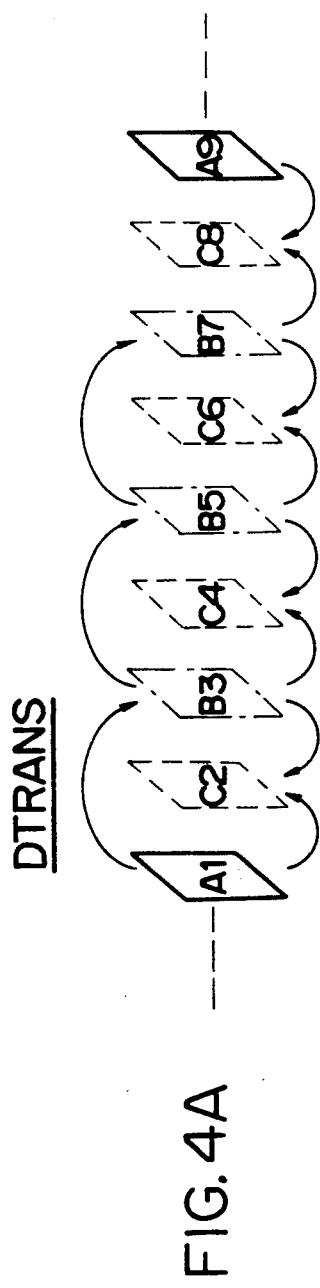
FIG. 4A
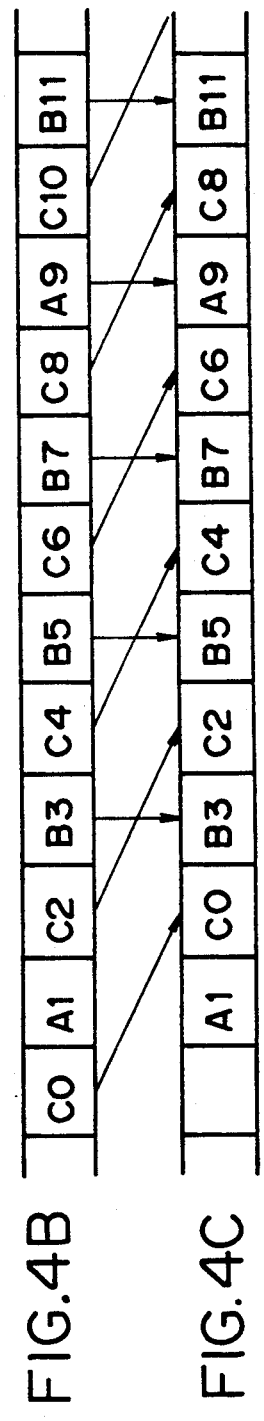
FIG. 4B
FIG. 4C
FIG. 4D

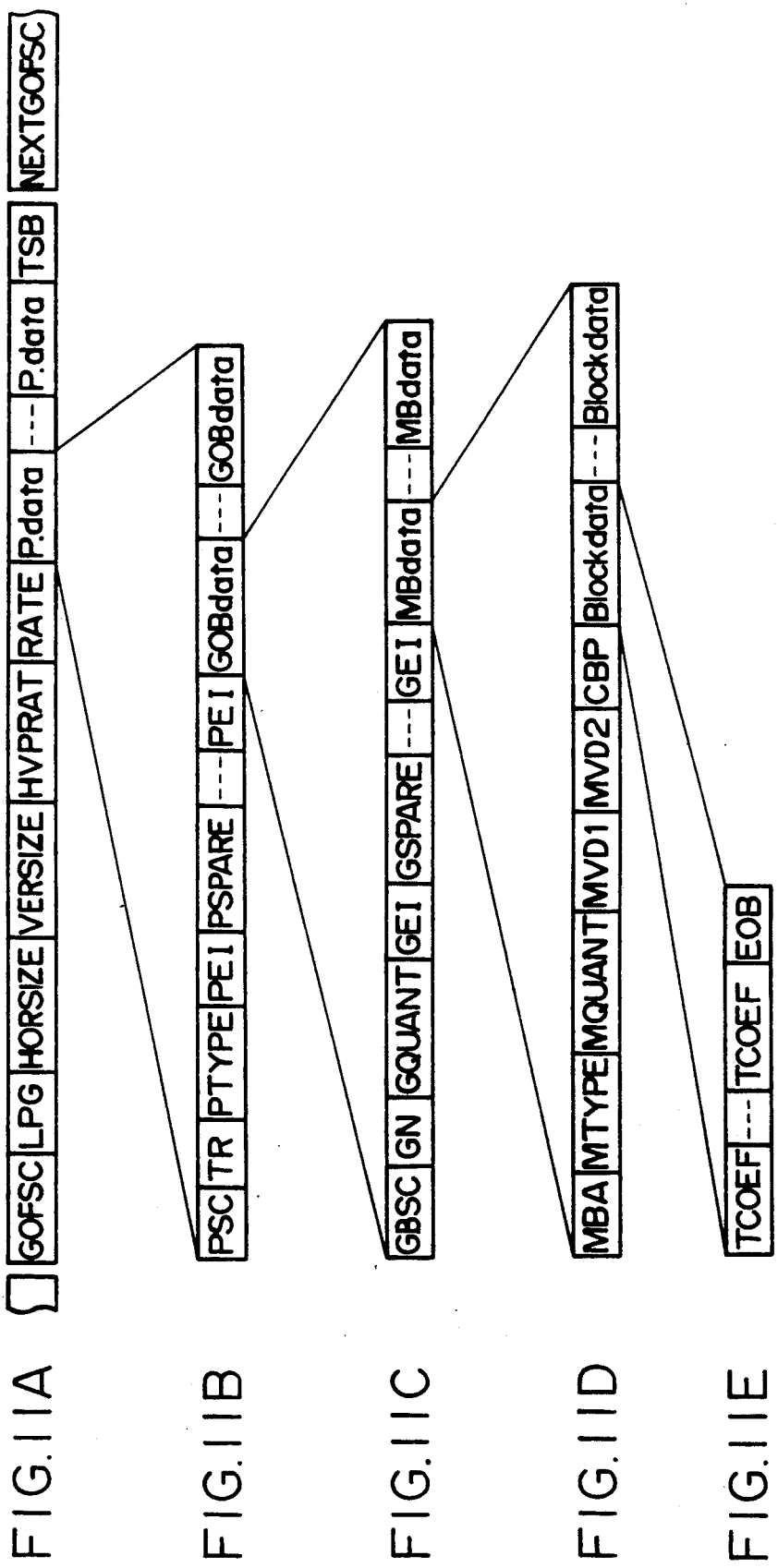

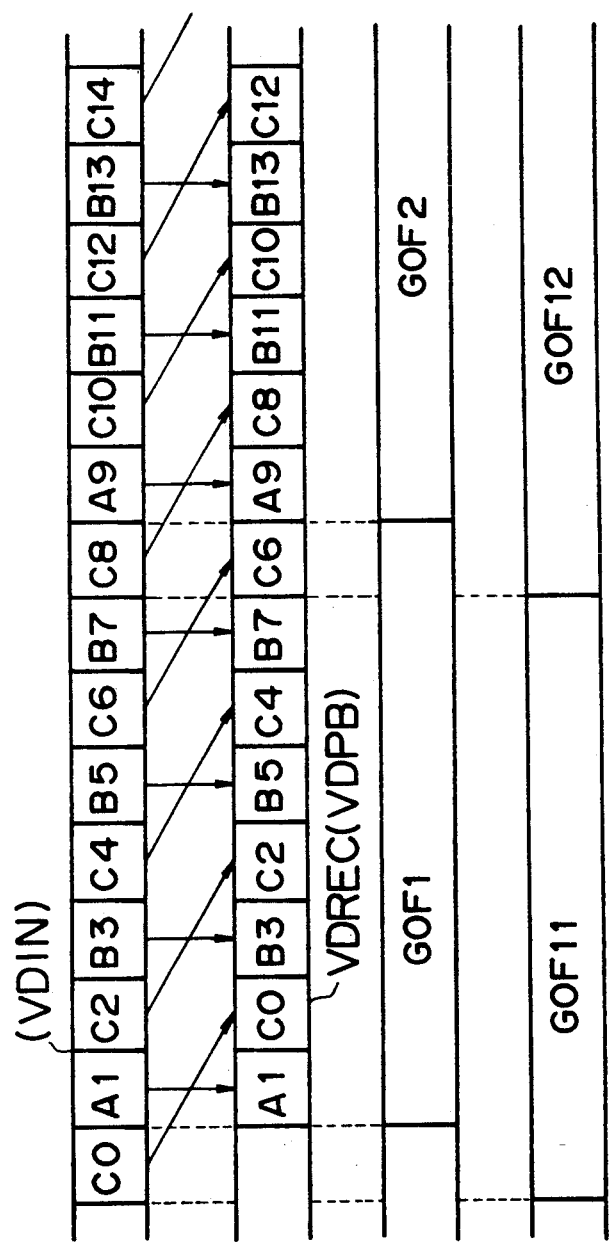

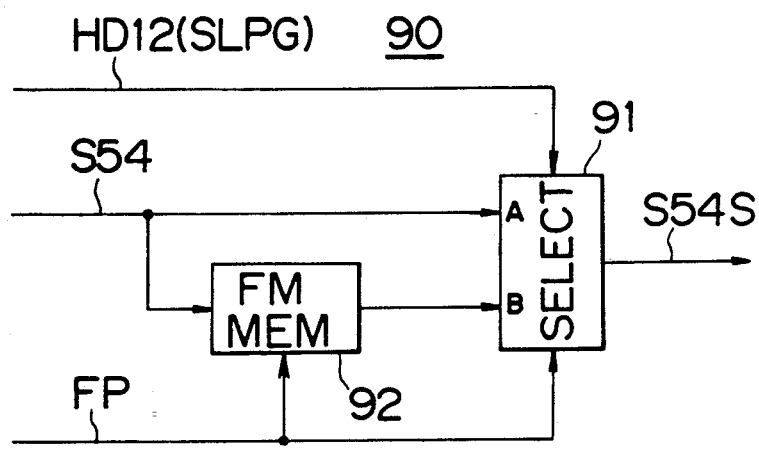
F I G. 16
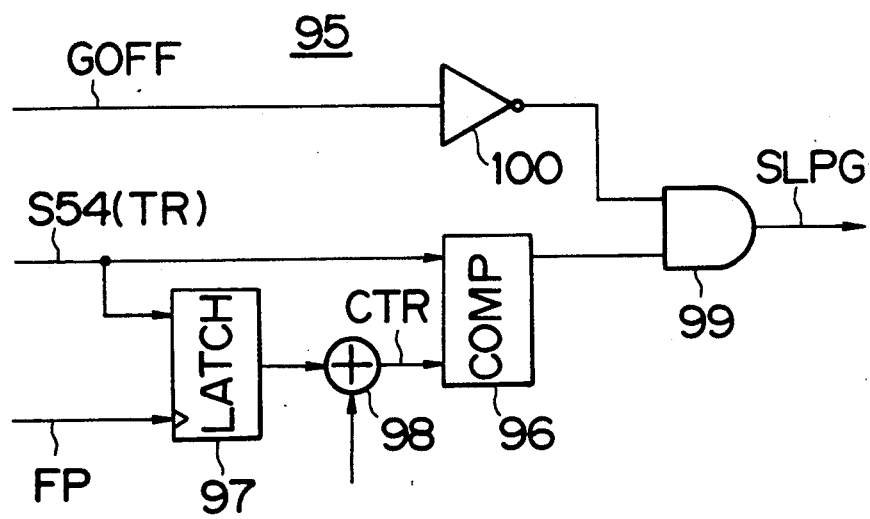
F I G. 17

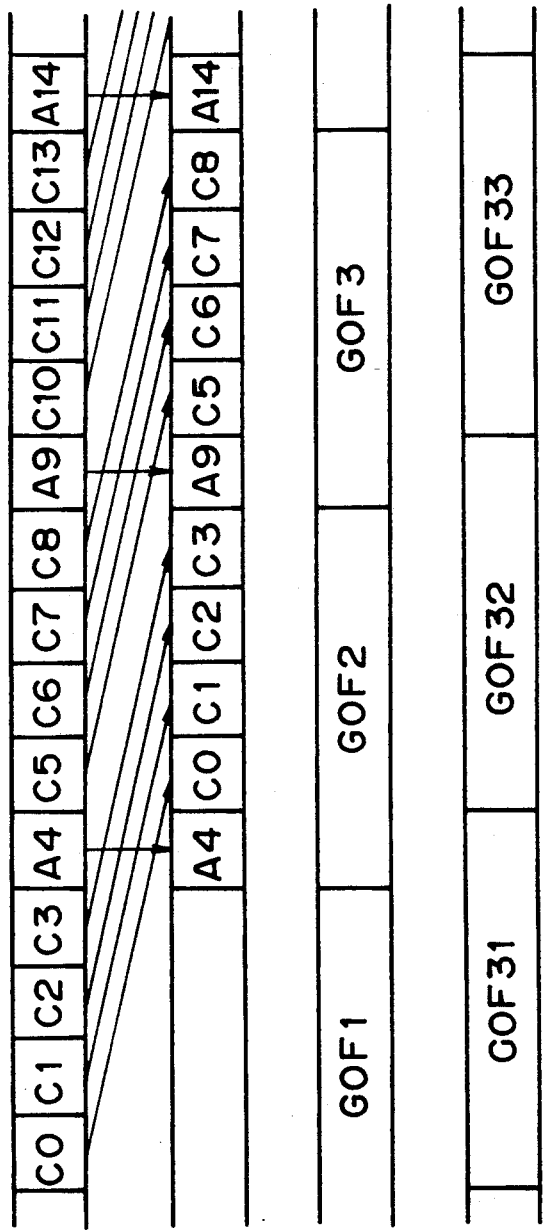

METHOD FOR RECORDING CODED MOTION PICTURE DATA

BACKGROUND OF THE INVENTION

The present invention relates to recording encoded motion picture video data, and is particularly applicable to editing coded motion picture data which has been obtained by high efficiency coding of video signals.

Heretofore, there has been proposed a recording/reproducing system in which video signals which represent a moving picture image are high efficiency encoded as intraframe coded data and interframe coded data. This encoded data admit of high density, and are recorded on a compact disk, such as a magneto-optical compact disk (CD-MO disk), which may be searched and reproduced when desired (see, for example, Japanese Patent (unexamined) Publication No. 63 (1988)-1183 and Japanese Patent Application No. 1 (1989)-267049).

More specifically, for example, as shown in FIG. 1, each image frame PC1, PC2, PC3, ... which are motion picture imaged at respective times t=t1, t2, t3, ... is digitized and then sent to a transmission system including CD-MO recording/reproducing system, for example. Processing is performed to enhance transmission efficiency by compressing the image data to be transmitted. Data compression relies upon the fact that video signals exhibit high autocorrelation over time. In intraframe coding, image differences are obtained by comparing pixel data in a image frame with reference data and for each of the image frames pC1, pC2, pC3, ..., in which intraframe coding is carried out, image data is sent, the image data having been compressed using autocorrelation between pixel data in the same frame.

For interframe coding, differences in the pixel data between adjacent images PC1 and PC2, PC2 and PC3, ..., respectively, are calculated to produce image data PC12, PC23, etc. This interframe encoded image data are sent together with the intraframe encoded image data obtained from the initial image frame PC1 at the time t=t1.

It is thus possible to code the images PC1, PC2, PC3, ... with high efficiency to provide a reduced amount of digital data as compared to the case where all of the image data is sent. The compressed data then may be recorded on a CD-MO recording/reproducing system.

The encoding of such video signals is carried out in a coded motion picture data generating unit 1 having a configuration shown in FIG. 2.

In the coded motion picture data generating unit 1, conventional processing techniques are used on input video signals VD, such as every other field dropping, one field line thinning, and the like, in a preprocessing circuit 2, and luminance signals and chrominance signals of the processed video signals are then converted to transmission unit block data S11 (hereinafter referred to as a macro block). The macro block data S11 is comprised of data representing 16 pixels (horizontal)×16 pixels (vertical) and is fed to an image data coding circuit 3.

The image data coding circuit 3 receives predictive current frame data S12 produced by a predictive coding circuit 4 (which is conventional) and calculates the difference between that data and the macro block data S11 to thereby generate interframe coded data (this is referred to as the interframe coding mode). This interframe data is fed to a transform coding circuit 5 as differential data S13. Image data coding circuit 3 also operates to produce intraframe encoded data by calculating the difference between the macro block data S11 and reference data, as is conventional. In the intraframe coding mode the intraframe data is supplied as differential data S13 to the transform coding circuit 5.

The transform coding circuit 5 consists of a discrete cosine transform circuit, and, as is known, performs high efficiency coding on the differential data S13 by orthogonal transformation to produce transform coding data S14. The transform coding data S14 is supplied to a quantization circuit 6, which produces quantized image data S15.

The quantized image data S15 which has been thus obtained from the quantization circuit 6 undergoes further high efficiency coding in a retransform coding circuit 7 which includes a variable length coding circuit, and is then supplied as transmission image data S16 to a transmission buffer memory 8.

In addition to this, the quantized image data S15 is subjected to inverse quantization and inverse transform coding in the predictive coding circuit 4, and is thereby decoded to produce the predictive current frame data S12 which is compared to the macro block data S11 to generate the differential data. The predictive coding circuit 4 corrects predictive previous frame data as a function of the differential data, and thereby stores new predictive previous frame data. Furthermore, the predictive previous frame data which is stored in the predictive coding circuit 4 is motion compensated by motion detection data produced from the macro block data S11 to thereby produce predictive current frame data, which is fed to the image data coding circuit 3. Thus, the difference between the macro block data S11 of a frame to be currently transmitted (i.e., the current frame) and the predictive current frame data S12 is obtained as the differential data S13.

If the motion picture images described with reference to FIG. 1 are processed by the unit of FIG. 2, the image data of the image frame PC1 is firstly provided as the macro block data S11 at a time t1 (FIG. 1) and the image data coding circuit 3 is placed in the intraframe coding mode. Hence, intraframe coded differential data S13 is supplied to the transform coding circuit 5, and intraframe transmission image data S16 is supplied to the transmission buffer memory 8 via the quantization circuit 6 and retransform coding circuit 7.

Concurrently, the quantized image data S15 obtained at the output of the quantization circuit 6 undergoes predictive coding in the predictive coding circuit 4, and the predictive previous frame data which represents the transmission image data S16 sent to the transmission buffer memory 8 is thereby held in the previous frame memory. When macro block data S11 which represents the image PC2 at t=t2 is subsequently fed to the image data coding circuit 3, it is interframe encoded (or motion compensated) by using the predictive current frame data S12.

Thus the image data coding circuit 3 supplies interframe coded differential data S13 to the transform coding circuit when image frame PC2 is encoded and thereby differential data which represents a shift of the image between the frames PC1 and PC2 is fed as transmission image data S16 to the transmission buffer memory 8. Concurrently, the predictive previous frame data is produced and stored in the predictive coding circuit 4 by supplying the quantized image data S15 to the predictive coding circuit 4.

While interframe coding is used for successive image frames, only differential data which represents the shift of the image between the previous frame and the current frame is sequentially sent to the transmission buffer memory 8 by repeating the foregoing operations.

The transmission buffer memory 8 temporarily stores the transmission image data S16 which is sequentially read and sent as transmission data DTRANS Via a transmission line 9 (for example for recording) at a data transmission rate which depends on the transmission capacity of the transmission line 9.

At the same time, the transmission buffer memory 8 detects the amount of the data therein remaining to be transmitted, and feeds back an indication S17 of the remaining data amount to the quantization circuit 6 to control the quantization step size according to this remaining amount indication S17. Thus, an appropriate amount of remaining data (which will not produce overflow or underflow) is kept in the transmission buffer memory 7 by adjusting the amount of data which constitutes the transmission image data S16.

If the remaining amount of data in the transmission buffer memory 8 reaches an upper allowable limit, the step size of the quantization step STPS (FIG. 3) of the quantization circuit 6 is increased so that coarser quantization is carried out in the quantization circuit 6 to thereby decrease the amount of data which constitutes the transmission image data S16.

On the other hand, if the amount of data remaining in the transmission buffer memory 8 decreases to a lower allowable limit, the step size of the quantization step STPS of the quantization circuit 6 becomes smaller, whereby the amount of data which constitutes the transmission image data S16 is increased because the quantization circuit 6 carries out finer quantization.

It will be appreciated that the coded motion picture data generating unit 1 operates to produce compressed moving picture data DTRANS in accordance with ISO standard 11172 comprised of intraframe coded frames A1, A9, . . . (hereinafter referred to as intraframes and indicated by the character "A"), interframe coded previous frame prediction coded frames B3, B5, B7, . . . (hereinafter referred to as predictive frames and designated by the character "B"), and interpolated prediction coded frames C2, C4, C6, . . . (hereinafter referred to as interpolated frames and indicated by the character "C") representing the sequence of input image frames of video data VD as shown in FIGS. 4A and 4B.

According to the ISO standard, when this transmission data DTRANS is received or reproduced and the image frame corresponding to the interpolated frame C2, for example, is to be recovered, the intraframe A1 and the predictive frame B3 are needed as shown in FIG. 4C to decode the interpolated frame C2. Hence, a memory and a memory control circuit are needed to decode this encoded motion picture data. That is, the memory is needed to delay the interpolated frame C2 until the intraframe A1 and the predictive frame B3 are received. This makes the decoder circuit configuration rather complicated and excessively enlarges the amount of decoder delay.

For this reason, the Moving Picture Expert Group (MPEG) of the ISO has proposed that the transmission data DTRANS be reordered before transmission (or recording) as shown in FIG. 4C to facilitate the decoding operation. The reordered transmission data DTRANS is recorded in groups of frames GOF1. GOF2, each of which is formed of 8 frames (A1, C2, B3, C4, B5, C6, B7 and C8) between intraframes A1 and A9, . . . and each group of frames GOF is recorded in 20 sectors, for example, of the CD-MO disk.

However, if an edit operation is carried out to replace group of frames GOFI, for example, recorded on a CD-MO disk with a new group of frames, it is not possible to reproduce video signals accurately from the new group of frames because the interpolated frame C8 which had been reordered and recorded in the old group of frames GOF2 had been part of the old group of frames GOF1 and, as shown in FIG. 4A, when frame C8 is decoded it will be interpolated on the basis of the new seventh predictive frame B7 in the new group of frames GOF1 and the old first intraframe A9 in the group of frames GOF2. But, frame C8 had been recorded prior to editing by interpolating the old seventh prediction frame B7 of the old group of frames GOFI and, thus, the old seventh predictive frame B7 (which had been replaced by the edit operation) is needed to decode frame C8. As a result, there is a problem in that the edited video data DTRANS is not correctly reproduced.

OBJECTS AND SUMMARY OF THE INVENTION

In view of the foregoing, an object of the present invention is to provide method of recording coded moving picture data which overcomes the problem of the prior art and permits coded moving picture data to be freely edited.

The foregoing object and other objects of the invention have been achieved by the provision of a method of recording coded moving picture data, in which video signals VDIN are intraframe coded and interframed coded and quantized to produce coded moving picture data VDREC which is recorded on a predetermined recording medium in groups of frames GOF formed of a predetermined number of intraframe coded or interframe coded frames, and if one or more groups of frames GOF are edited, edit flags (LPG) are set in the groups of edited frames GOF and/or in the group of frames immediately following the edited frames. As a feature of this invention, frame numbers (TR) are added to the coded moving picture data VDREC and are recorded on the recording medium; and if the coded moving picture data is edited, a new group of frames GOF is provided with a new frame number (TR) different from the frame numbers that had been recorded prior to editing.

As another feature of this invention, the interframe coded frames B and C (that is, the predictive and interpolated frames) in the group GOF recorded on the recording medium are derived only from the intraframe and interframe coded frames A and B in that group GOF.

In editing coded moving picture data VDREC recorded on a recording medium, the edit operation is freely carried out by discriminating the edit flags in the groups of edited frames GOFN.

A predetermined number of intraframe or interframe coded frames ar made self-sufficient within one group of frames GOF, whereby editing is freely and simply carried out.

The nature, principle and utility of the invention will become more apparent from the following detailed description when read in conjunction with the accom-

BRIEF DESCRIPTION OF THE DRAWINGS

In the accompanying drawings:

FIGS. 4A-4D are diagrammatic views illustrating a conventional recording sequence of moving data;

FIGS. 11A-11E are schematic diagrams illustrating the format of data that is recorded and reproduced;

FIGS. 12A-12D are diagrammatic views showing the recording sequence of the coded moving picture data of the embodiment of FIG. 10.

FIG. 16 is a block diagram of another frame sequence reordering circuit;

FIG. 17 is a block diagram showing an incontinuity detection circuit ; and

FIGS. 18A-18D and 19A-19D are diagrammatic views illustrating the recording sequence of coded moving picture data according to other data compression formats.

DETAILED DESCRIPTION OF THE INVENTION

Figure 1:
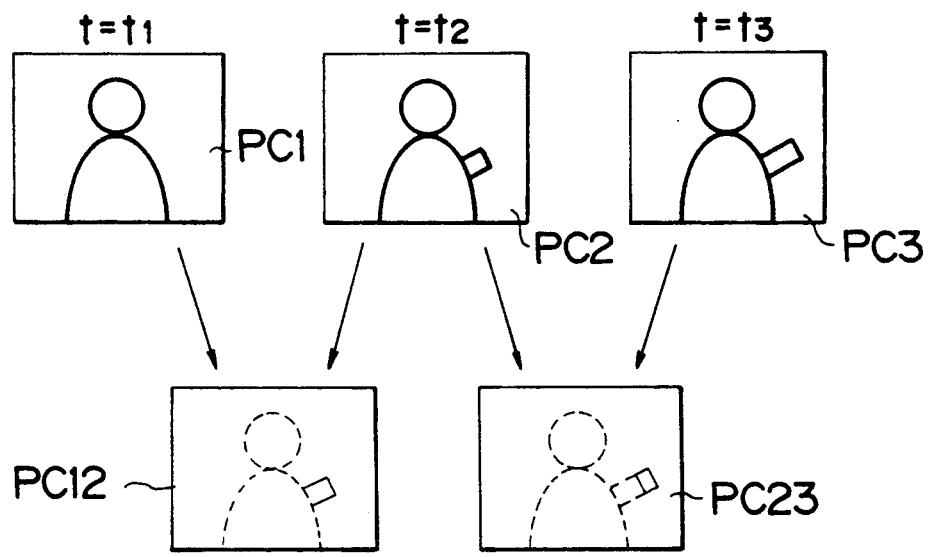
FIG. 1 is a diagrammatic view illustrating intraframe/interframe coding.
Figure 3:
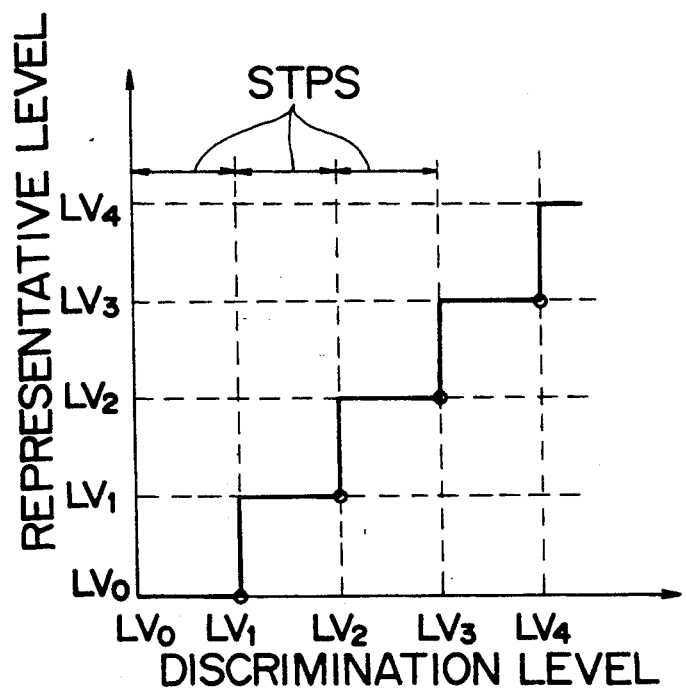
FIG. 3 is a characteristic graph representing a quantization step.
Figure 2:
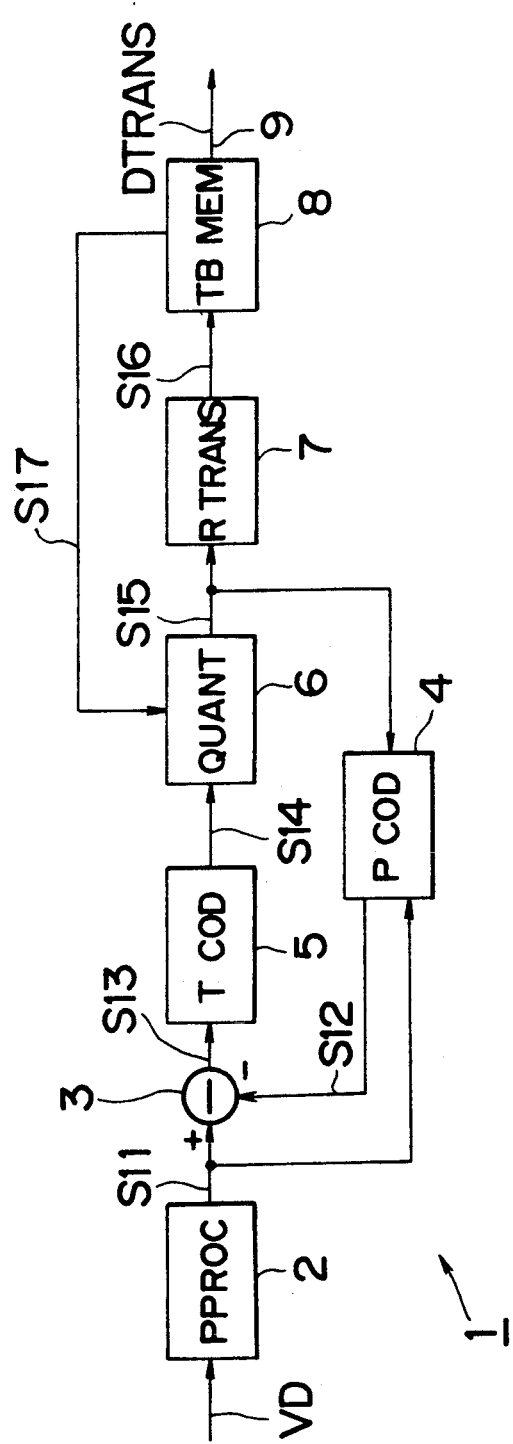
FIG. 2 is a block diagram of a conventional coded moving picture data generating unit.

Referring to the drawings, one embodiment in which the present invention is applied to a coded moving picture data recording/reproducing system will be described in detail hereinafter.

Figure 5A:
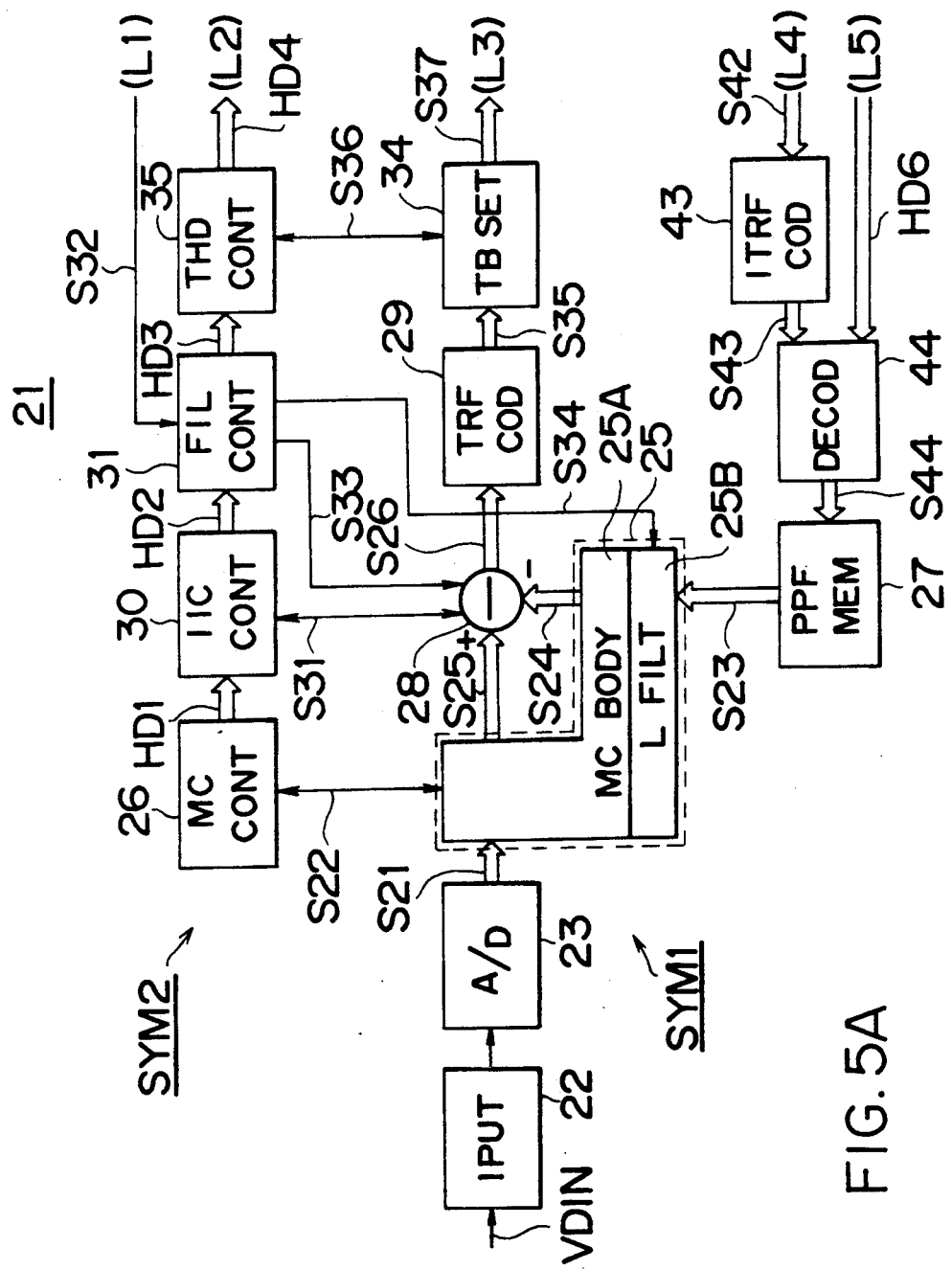
FIGS. 5A, 5B and 6 are block diagrams illustrating a moving picture coding system and a moving picture decoding system in which the present invention finds ready application.
Figure 5B:
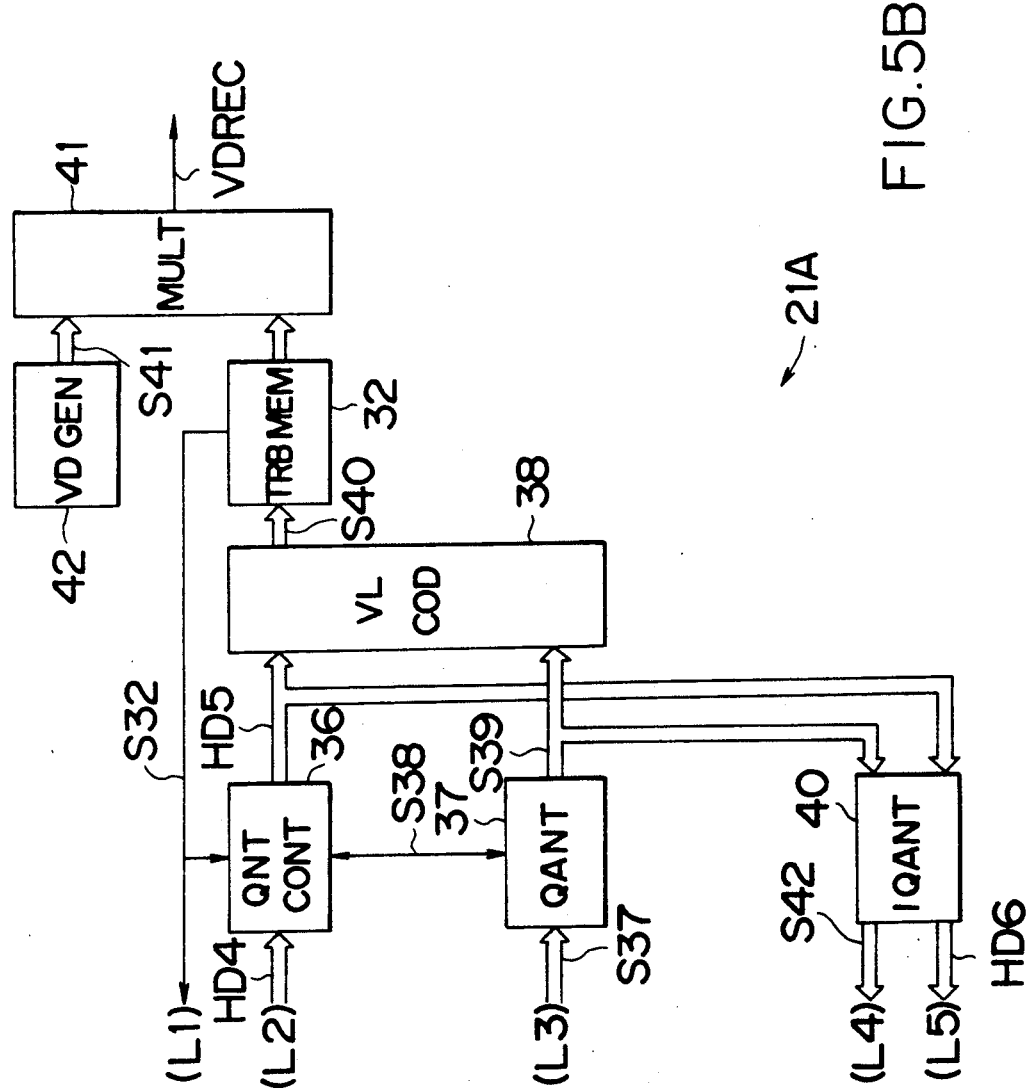
Figure 6:
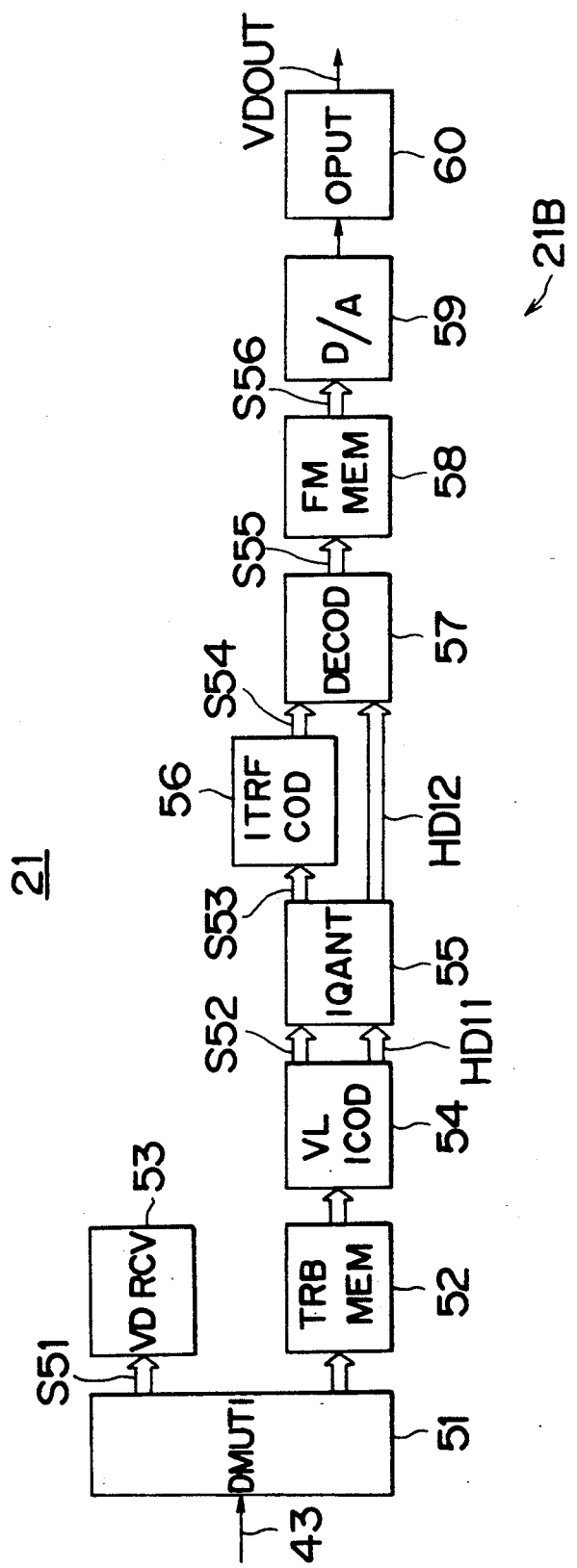

The general configuration of a conventional moving picture coding/encoding system that conforms with ISO standard 11172 is shown in FIGS. 5A, 5B and 6, in which a moving picture coding/encoding system 21 consists of a moving picture coding system 21A and a moving picture decoding system 21B. The moving picture coding system 21A preprocesses an input video signal VDIN in an input circuit 22 and then sends input image data S21, which is pixel data formed of 16 by 16 pixels, that is, pixel data of a macro block MB, from an analog/digital conversion circuit 23 to a pixel data processing system SYM1. In synchronism with each processing step of pixel data in a macro block MB by processing system SYM1, processing information data (or header data) corresponding to the pixel data to be processed is sequentially transmitted through a header data processing system SYM2. Thus, the pixel data and the header data are parallel processed in the pixel data processing system SYM1 and the header data processing system SYM2, respectively.

Figure 7:
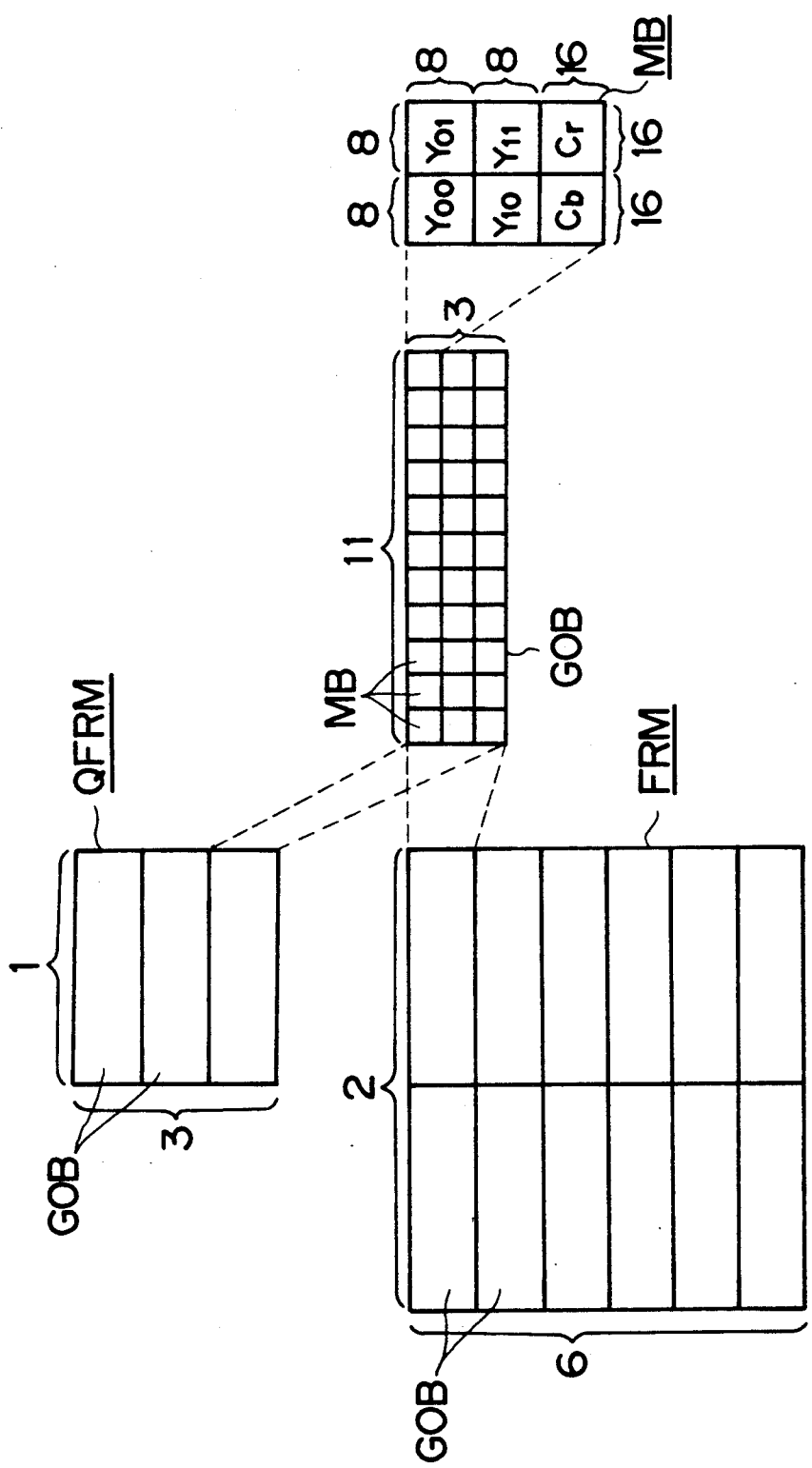
FIG. 7 is a schematic diagram showing the construction of a frame of image data.

In this embodiment, macro block data which is sent as sequential macro blocks in the input image data S21 is extracted from frame image data FRM according to a technique shown in FIG. 7.

Firstly, if the input video signals VDIN have a picture size (176×144 pixels), frame image data QFRM of a frame is separated into 3 slices formed of 1 (horizontal)×3 (vertical) block groups GOB. Each block group GOB contains 11 (horizontal) ×3 (vertical) macro blocks MB. Each macro block MB contains 16 by 16 pixels of luminance signal data Y00-Y11 (divided into four arrays of 8 by 8 pixels of luminance signal data) and chrominance signal data Cb and Cr (the chrominance signal data corresponds to the pixel data of the luminance signal data Y00-Y11) a is conventional.

Secondly, if the input video signals VDIN have a picture size (352×288 pixels), frame image data FRM of a frame is separated into twelve slices formed of 2 (horizontal)×6 (vertical) block groups GOB. Each block group GOB contains 11 (horizontal)×3 (vertical) macro blocks MB. As before, each macro block MB contains 16 by 16 pixels of luminance signal data Y00-Y11 (divided into four arrays consisting of 8 by 8 pixels of luminance signal data) and chrominance signal data Cb and Cr (the chrominance signal data corresponds to the pixel data of the luminance signal data Y00-Y11).

Figure 8A:
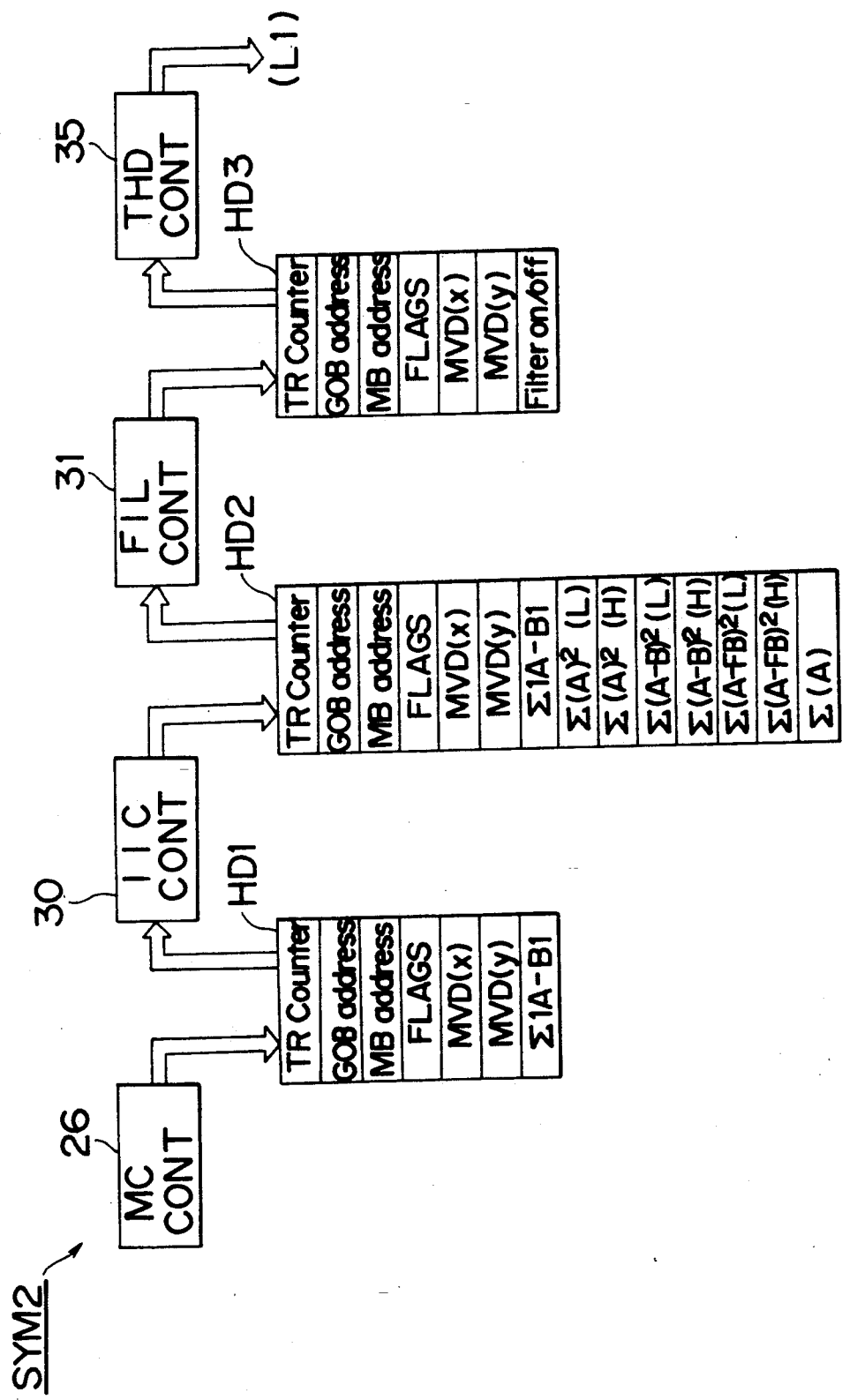
FIGS. 8A and 8B are block diagrams illustrating the header data processing of FIGS. 5A and 5B.

The input image data S21 which represents each macro block MB is fed to a motion compensation circuit 25. The motion compensation circuit 25 compares the input image data S21 and predictive previous frame data S23 from a predictive previous frame memory 27 in response to a motion detection control signal S22 fed from a motion compensation control unit 26, which is provided in the header data processing system SYM2, whereby the motion compensation circuit 25 operates in a known manner to detect motion vector data MVD(x) and MVD(y), which are supplied as first header data HDI (FIG. 8A) to the motion compensation control unit 26. Furthermore, the motion compensation circuit 25 produces predictive current frame data S24 by motion compensating the predictive previous frame data S23 by the motion vector data MVD(x) and MVD(y) in a motion compensation section 25A. The predictive current frame data S24 is fed to a image data coding circuit 28 together with current frame data S2 which is the input image data S21 to be processed.

As shown in FIG. 8, the motion compensation control unit 26 identifies each macro block MB, which is sequentially transmitted in the pixel data processing system SYM1, by adding the following as first header data HD1 for the macro block being currently processed: transmission frame number data "TR Counter" representing the transmission sequence of the frame image data FRM; block group number data "GOB address" representing the block group GOB (FIG. 7); and macro block number data "MB address" representing the macro block in the group. Moreover, the motion compensation control unit 26 selectively sets flag data "FLAGS" representing the processing of the macro block MB, and also produces the motion vector data "MVD(x)" and "MVD(y)" of the macro block MB, as well as differential data "Σ A-B " which represents an evaluation of the macro block.

Figure 9:
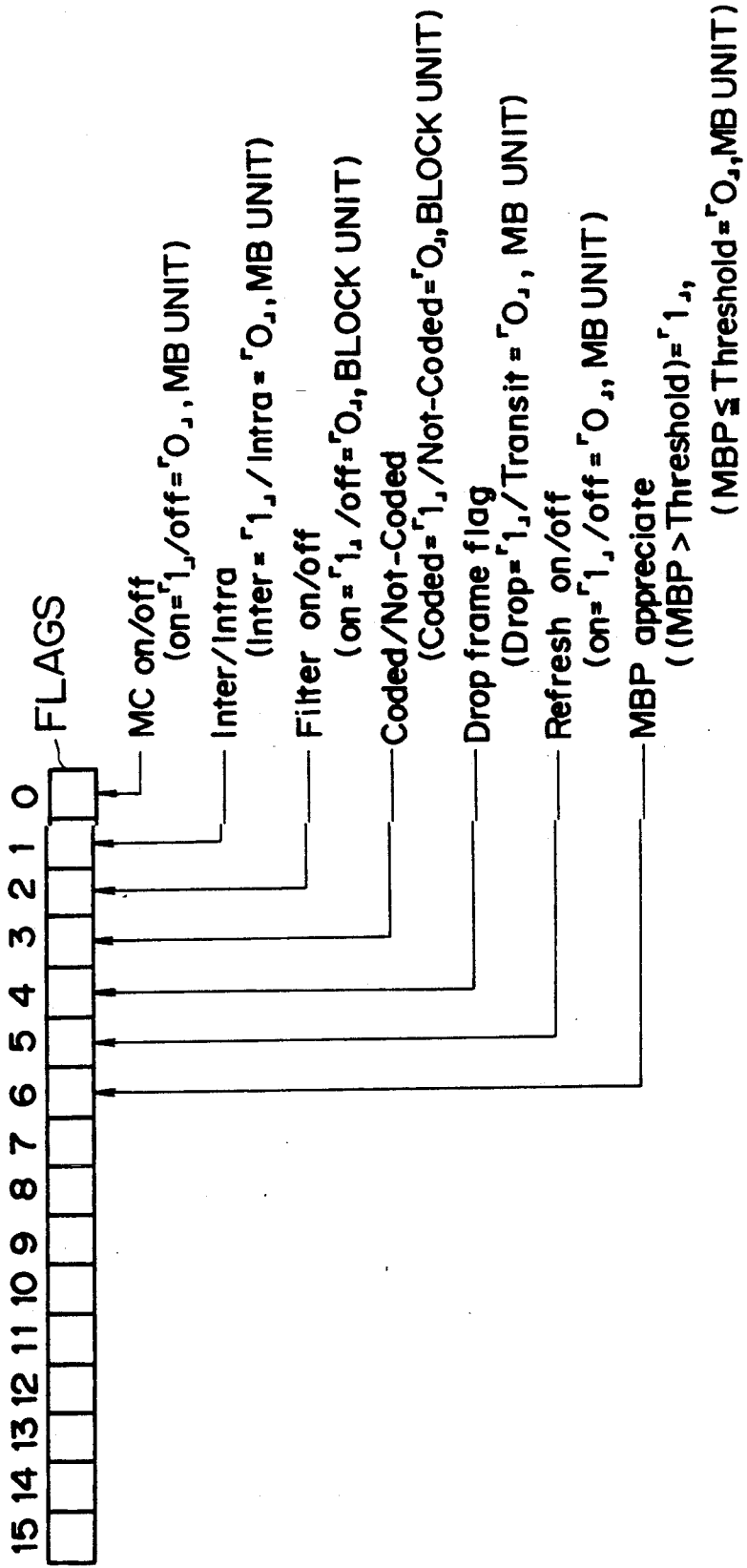
FIG. 9 is a schematic diagram showing the construction of flag data used in FIGS. 8A and 8B.

As shown in FIG. 9, the flag data "FLAGS" is provided with a maximum of one word (16 bits) of flags. A motion compensation control flag "MC on/off" which represents whether or not the macro block MB to be processed should be processed in the motion compensation mode constitutes the zero bit of the flag data "FLAGS".

Bit 1 of the flag data is the interframe/intraframe flag Inter/Intra which represents whether the macro block MB to be processed is encoded in the interframe coding mode or in the intraframe coding mode.

Bit 2 of the flag data is a filter flag "Filter on/off" which represents whether or not a loop filter 25B of the motion compensation circuit 25 is used.

Bit 3 of the flag data is a transmission flag "Coded/-Not-coded" which represents whether or not block data Y00 - Cr (FIG. 7) contained in the macro block MB to be processed should be sent.

Bit 4 of the flag data is a drop frame flag "Drop frame flag" which represents whether or not the frame containing the macro block MB to be processed is dropped.

Bit 5 of the flag data is a forced refreshing flag "Refresh on/off" which represents whether or not the macro block MB to be processed is forcedly refreshed, that is, whether intraframe coding is used periodically.

Bit 6 of the flag data is a macro block power appreciation flag "MBP appreciate".

Other flags are reserved.

The differential data "$\Sigma$ A-B" represents a minimum value in the differences between the macro block data A of the current frame data S25 and macro block data B derived by compensating the predictive previous frame data S23 with detection motion vectors.

In the intraframe coding mode, the image data coding circuit 28 feeds the current frame data S25, which is provided from the motion compensation circuit 25, as difference data S26 to a transform coding circuit 29 without any change. On the other hand, in the interframe coding mode the difference data S26 represents the difference between the pixel data of the current frame data S25 and the pixel data of the predictive current frame data S24 and this difference data S26 is fed to the transform coding circuit 29.

In the header data processing system SYM2, an interframe/intraframe coding control unit 30 is provided in correspondence with the image data coding circuit 28. The interframe/intraframe coding control unit 30 combines the first header data HDI, fed from the motion compensation control unit 26, and operation data S31, supplied from the image data coding circuit 28, to selectively set the interframe/intraframe flag "Inter/Intra" and the filter flag "Filter on/off" (FIG. 9) and sends the resulting header data as second header data HD2 to a filter control unit 31. The interframe/intraframe flag "Inter/Intra" indicates the coding mode of the image data coding circuit 28 whereas the filter flag "Filter on/off" controls the operation of the loop filter 25B of the motion compensation circuit 25.

As shown in FIG. 8, the second header data HD2 continues the data which constitutes the first header data HD1 (namely, from the transmission frame number data "TR Counter" to the differential data "$\Sigma$ A-B"). Furthermore, the interframe/intraframe coding control unit 30 adds power data needed to produce an interframe/intraframe coding mode switching signal S33 and a filter on/off signal S34 to the second header data HD2, the power data corresponding to the ISO standard and represented by "$\Sigma(A)^2(L)$" and "$\Sigma(A)^2(H)$", $\Sigma(A-B)^2(L)$" and $\Sigma(A-B)^2(H)$", $\Sigma(A-FB)^2(L)$" and $\Sigma(A-FB)^2(H)$", and $\Sigma(A)$".

The power data "$\Sigma(A)^2(L)$" and $\Sigma(A)^2(H)$" represent the lower bit and the upper bit of the sum of the squares of macro block pixel data A of the current frame data S25. The power data $\Sigma(A-B)^2(L)$" and $\Sigma(A-B)^2(H)$" represent the lower bit and the upper bit of the sum of the squares of the difference |A-B| of the macro block pixel data A of the current frame data S25 and macro block pixel data B of the predictive current frame data S24, without passing through the loop filter 25B. The power data "$\Sigma(A-FB)^2(L)$" and "$\Sigma(A-FB)^2(H)$" represents the lower bit and the upper bit of the sum of the squares of the difference A-FB between the macro block pixel data A of the current frame data S25 and macro block pixel data FB of the predictive current frame data S24, which pass through the loop filter 25B. "$\Sigma(A)$" represents the sum of the macro block pixel data A of the current frame data S25. To evaluate the magnitude of this data, the amount of data is expressed as a power value (each sum of the squares is obtained as a value irrespective of sign).

A filter control unit 31 responds to the second header data HD2 fed from the interframe/intraframe coding control unit 30 and residual amount data S32 fed from a transmission buffer memory 32 to send an interframe/intraframe coding mode switching signal S33 to the image data coding circuit 28 and a filter on/off signal S34 to the loop filter 25B. In addition, the filter control unit 31 adds the filter flag "Filter on/off", representing the state of the filter on/off signal S34, to the second header data HD2 and supplies the resulting data as third header data HD3 to a threshold control unit 35.

The filter control unit 31 firstly controls the image data coding circuit 28 to operate in the intraframe coding mode when the amount of transmission data which is interframe coded is larger than the amount of transmission data which is intraframe coded.

Secondly, the filter control unit 31 controls the loop filter 25B not to perform the filtering operation when during the interframe coding mode, the predictive current frame data S24 which has not been processed in the loop filter 25B has a smaller differential value than the predictive current frame data S24 which has been processed in the filter.

Thirdly, the filter control unit 31 switches the image data coding circuit 28 to the intraframe coding mode in the forced refreshing mode (mentioned above).

Fourthly, the filter control unit 31 detects a state in which the transmission buffer memory 32 (FIG. 5B) is liable to overflow data (as indicated by the residual amount data S32 provided from the transmission buffer memory 32) and thereby sends to the threshold control unit 35 the third header data HD3 which contains a flag to command the execution of a frame dropping procedure.

The image data coding circuit 28 supplies to the transform coding circuit 29 difference data S26 which has been encoded in such a mode that the difference between the current frame data S25 and the predictive current frame data S24 is minimum.

As shown in FIG. 8, the third header data HD3 includes the header data from the frame number data "TR Counter" to the motion vector data "MVD(x)" and "MVD(y)" previously contained in the second header data HD2, and the filter control unit 31 adds to the third header data HD3 6 filter flag bits "Filter on/off" which correspond to the block data Y00 to Cr.

The transform coding circuit 29 is a discrete cosine transform circuit and supplies to a transmission block setting circuit 34 transform code data S35 which is obtained by zigzag scanning discrete cosine transformed coefficients per six blocks Y00, Y01, Y10, Y11, Cb and Cr.

The transmission block setting circuit 34 computes the sum of squares coefficient data in the number n from the leading data for each of the six block data Y00 to Cr (FIG. 7) and supplies this sum of squares coefficient data as power detection data S36 to the threshold control unit 35.

The threshold control unit 35 compares the power detection data S36 of each of the block data Y00 to Cr to a predetermined threshold and thereby produces 6 bits of transmission permitted/not-permitted data "CBPN" which does not permit the block data to be transmitted when the power detection data S36 is smaller than the threshold but does permit the block data to be transmitted when the power detection data S36 is larger than the threshold. This data CBPN is added to the third header data HD3 which is received from the filter control unit 31. The threshold control unit 35 supplies the resulting data to a quantization control unit 36 as fourth header data HD4 and controls the transmission block setting circuit 34 to sent corresponding block data Y00 to Cr as transmission block patterning data S37 to a quantizer 37 (FIG. 5B).

Figure 8B:
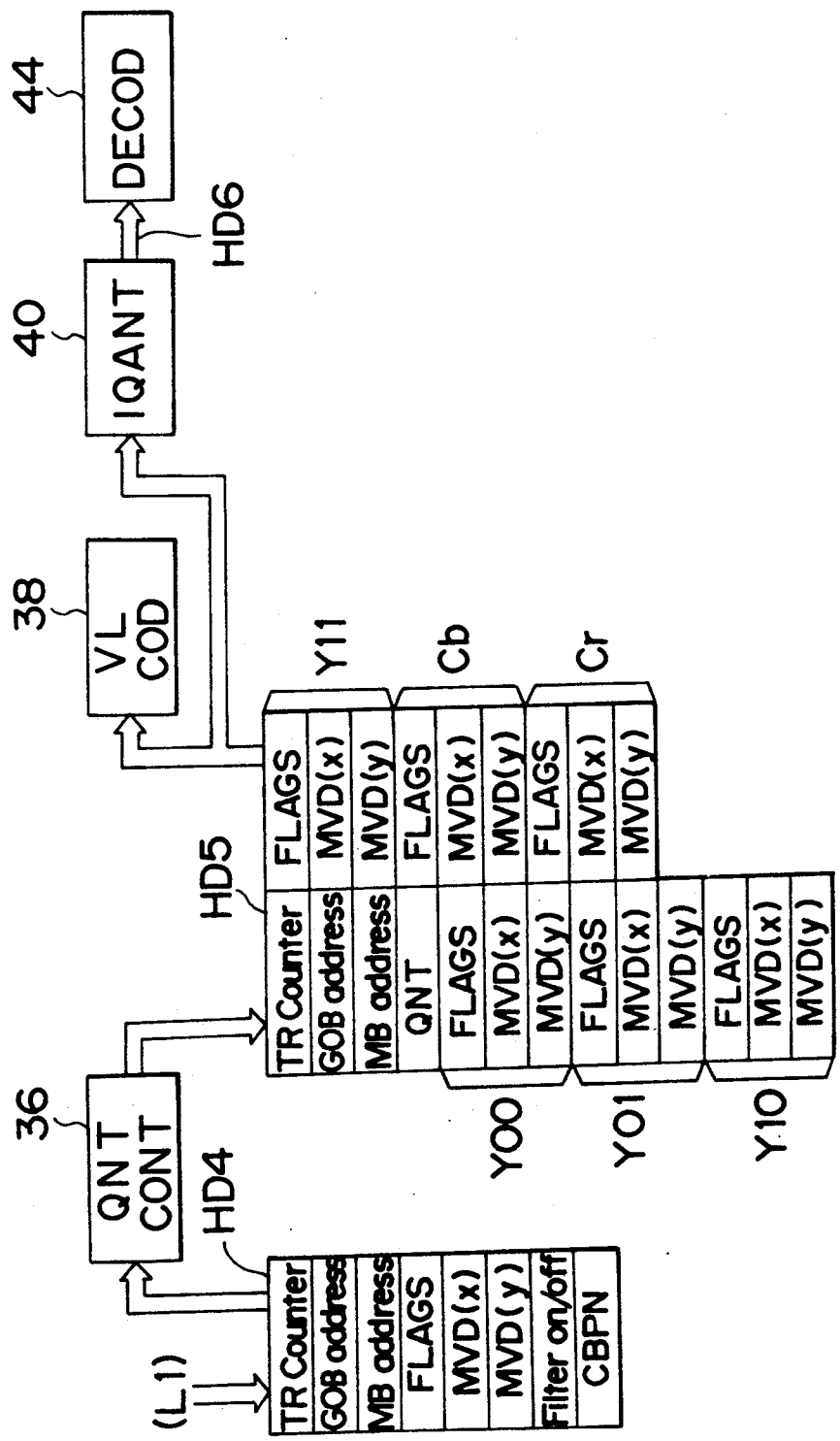

Here, as shown in FIG. 8B the fourth header data HD4 includes the header data HD3 from the transmission frame number data "TR Counter" to the filter flag "Filter on/off" without any change, and adds thereto 6 bits of the transmission permitted/not-permitted flag "CBPN", which as been generated at the threshold control unit 35 to correspond to the blocks Y00 to Cr.

In response to the fourth header data HD4 from the threshold control unit 35 and the residual amount data S32 from the transmission buffer memory 32, the quantization control unit 36 determines a quantization step size, and thereby sends a quantization step size control signal S38 to the quantizer 37 to control the quantizer 37 to perform quantization at the quantization step size which is matched to the data contained in the macro block MB. Quantized image data S39 obtained at the output terminal of the quantizer 37 is fed to a variable length coding circuit 38.

In addition, the quantization control unit 36, as shown in FIG. 8, compiles header data HD5 in which the flag data "FLAGS" and the motion vector data "MVD(x)" and "MVD(y)" are separated and arranged in series corresponding to each data block Y00 to Cr (FIG. 7). The quantization control unit 36 supples this header data HD5 to the variable length coding circuit 38 and to an inverse quantizer 40.

As shown in FIG. 8, the header data HD5 includes the data in header HD4 from the transmission frame number data "TR Counter" to the macro block "MB address" without any change, and the quantization control unit 36 adds quantization size data "QNT" and flag data "FLAGS" and motion vector data "MVD(x)" and "MVD(y)" to the header data HD5 for each data block Y00 to Cr.

The variable length coding circuit 38 performs a variable length coding operation on the header data HD5 and on the quantized image data S39 to produce transmission image data S40, which is supplied to the transmission buffer memory 32. When the block data Y00 to Cr is subjected to variable length coding, the variable length coding circuit 38 throws away the block data and does not send it as transmission image data S40 when "frame dropping" or when "transmission not permitted" is present, as may be indicated by the corresponding flag data "FLAGS".

The transmission buffer memory 32 stores the transmission image data S40, which is read at a predetermined transmission rate and combined with transmission voice data S41 supplied by a voice data generator 42, in the multiplexer 41 to produce coded motion picture data VDREC for the CD-MO unit.

The inverse quantizer 40 inverse quantizes the quantized image data S39, produced by the quantizer 37, as determined by the header data HD5, and then supplies the inverse quantization data S42 to inverse transform coding circuit 43 which produces therefrom inverse transform coded data S43. This coded data S43 is supplied to a decoder circuit 44 which produces coded differential data S44 to represent the image information sent as the transmission image data S40, and the coded differential data S44 is supplied to the predictive previous frame memory 27.

The predictive previous frame memory 27 corrects the predictive previous frame data stored therein by using the coded differential data S44 to store new predictive previous frame data.

Thus, in the motion picture coding system 21A having the configuration shown in FIGS. 5A and 5B, the pixel data processing system SYM1 pipelines pixel data in the unit of a macro block according to the header information fed from the header data processing system SYM2. Synchronously with pipelining of pixel data, header data is transferred in the header data processing system SYM2, and thereby the pixel data is appropriately processed while adding to or deleting from the header data in each step of the header data processing system SYM2 as needed.

As shown in FIG. 6, the moving picture decoding system 21B receives coded moving picture data VDPB reproduced in the CD-MO unit. This coded moving picture data is coupled to a transmission buffer memory 52 through a demultiplexer 51 while reproduced voice data S51 is coupled to a voice data receiving unit 53.

The pixel data supplied to the transmission buffer memory 52 is separated into image data S52 and header data HD11 in a variable length inverse transform circuit 54. The image data S52 is inverse quantized to form inverse quantized data S53 in an inverse quantizer 55, and is then inverse transformed to inverse transform coded data S54 by discrete inverse transformation in an inverse transform coding circuit 56.

The inverse transform coded data S54 is supplied to a decoder circuit 57 together with header data HD12 derived by the inverse quantizer 55, and the inverse transform coded data is decoded and stored as coded differential data S55 in a frame memory 58.

The transmitted (or reproduced) pixel data is decoded in the frame memory 58 from the coded differential data S55 to produce decoded image data S56. A digital/analog conversion circuit 59 converts the decoded image data S56 to analog signals, which are then outputted as output video signals VDOUT through an output circuit unit 60.

Figure 10:
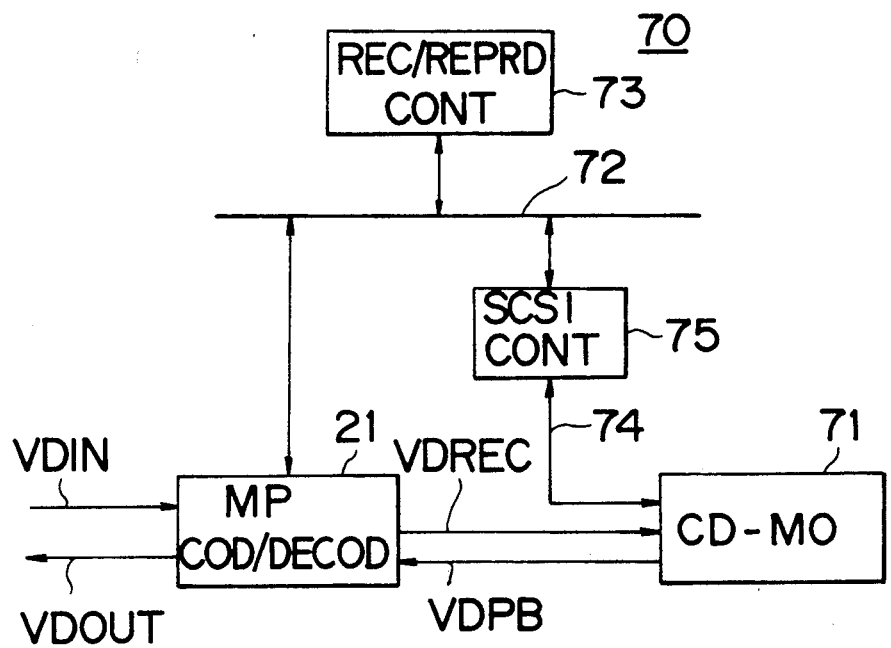
FIG. 10 is a block diagram showing one embodiment of a coded moving picture data recording/reproducing system.

FIG. 10 generally shows a coded moving picture data recording/reproducing system 70 which carries out the coded moving picture data recording method described below.

In this coded moving picture recording/reproducing system 70, input video signals VDIN are high efficiency coded through the moving picture coding/decoding system 21 in accordance with ISO standard 11172, for example, and the resulting coded moving picture data VDREC is supplied to a CD-MO unit 71 where it is recorded on the CD-MO disk (not shown).

Conversely, reproduced signals obtained from the CD-MO unit 71 are supplied as coded moving picture data VDPB to the moving picture coding/decoding system 21, and output video signals VDOUT obtained by decoding the resulting coded moving picture data VDPB are recovered.

In the coded moving picture recording/reproducing system 70, the moving picture coding/decoding system 21 is connected via bus 72 to a recording/reproducing controlling circuit 73 which includes a CPU (central processing unit). The coding of the input video signals VDIN and decoding of the coded moving picture data VDPB are controlled by this recording/reproducing controlling circuit 73.

In addition, the CD-MO unit 71 has a SCSI (small computer system interface) incorporated in it, and is connected to the recording/reproducing controlling circuit 73 through a SCSI bus 74, a SCSI control circuit 75 and bus 72. This enables the recording and reproducing operations to be controlled by the recording/reproducing controlling circuit 73.

The coded moving picture data VDREC produced by the moving picture coding/encoding system 21 is supplied to the CD-MO unit 71 in a format which has a layer structure as shown in FIG. 7, and the coded moving picture data VDPB is reproduced from the CD-MO unit 71 to the moving picture coding/decoding system 21 in the same format.

More specifically, data which corresponds to 8 frames of input video signals VDIN constitutes a group of frames GOF and in accordance with the ISO standard, each group of frames GOF consists of: a frame group start code (GOFSC) representing the start of the group of the frames; a link flag (LPG) representing a linking or continuous relationship, of this GOF to the immediately preceding GOF; data which represents horizontal and vertical sizes, the ratio of the number of horizontal and vertical pixels, and the like, for the frames to be recorded or sent (HORSIZE, VERSIZE, HVPRAT); data (RATE) representing the transmission rate of the frames; data (P.Data) representing the picture data of each of 8 respective frames; and a stuffing bit (TSB) (FIG. 11A).

The data P. data constitutes what generally is referred to as the picture layer of one frame, and as shown in FIG. 11B consists of a frame start code (PSC) representing the start of the frame, the frame number (TR), data (PEI, PSPARE) representing extension information, and several groups of blocks (GOB data) which comprise one picture frame and are known as the block group layer.

As shown in FIG. 11C, one block group of data (GOB data) in the block group layer is formed of a block group start code (GBSC) representing the start of the block group, address data (GN) of the block group, data (GQUANT) relating to requantization step size for the block group, data (GEI and GSPARE) representing extension information, and the several macro blocks (MB data) which are included in one GOB (See FIG. 7) and which are referred to as the macro block layer.

FIG. 11D illustrates that one macro block of data (MB data) in the macro block layer consists of data representing the address of the macro block (MBA), data representing the type of the macro block (MTYPE), data representing the requantization step size of the macro block (MQUANT), motion vector data in the macro block (MVD1, MVD2), data representing the block pattern in the macro block (CBP), and data (Block data) representing the several blocks which comprises one macro block (such as shown in FIG. 7) and which are referred to as the block layer.

FIG. 11E shows that one block of data in the block layer consists of coefficient data representing predetermined numbers (TCOEF) and data representing the end of the block layer (EOB).

In the typical moving picture coding system 21A the coded moving picture data VDREC reorders the sequence of picture frames of the input video signals VDIN shown in FIG. 12A to the order shown in FIG. 12B so as to facilitate the decoding operation of the moving picture decoding system 21B. This reordered frame sequence is supplied to and recorded by the CD-MO unit 71; and it also is reproduced by the CD-MO unit and coupled to the moving picture encoding system 21B.

Accordingly, when the interpolated frame C2, for example, is to be decoded, the intraframe A1 and the predictive frame B3 which are necessary for decoding the interpolated frame will have been recovered already and when the interpolated frame C4, for example, is to be decoded, the predictive frames B3 and B5 which are necessary for decoding also will already have been recovered. Thus, moving picture encoding system 21B is capable of decoding the interpolated frame C2 or C4 without delay.

Figure 13:
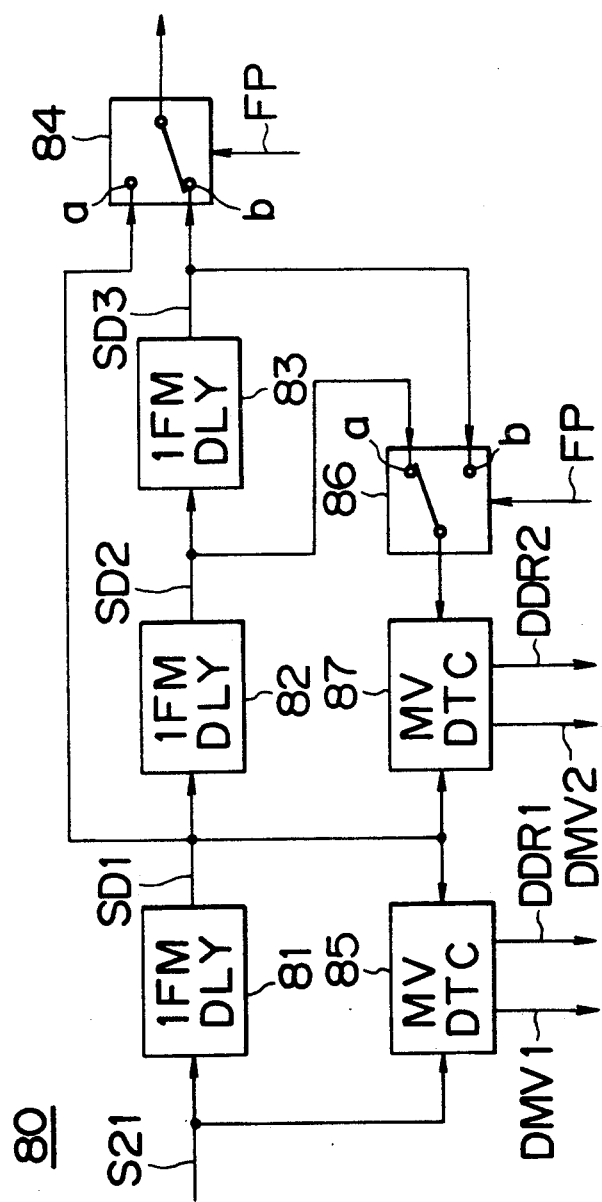
FIG. 13 is a block diagram showing a frame sequence reordering circuit.

The moving picture coding system 21A includes a frame order reordering circuit 80 incorporated into the motion compensation circuit 25, as shown in FIG. 13, to reorder the order of the frame sequence for recording.

This frame order reordering circuit 80 includes one frame delay circuits 81, 82 and 83, and is adapted to detect motion vectors as well as to reorder the sequence of the frames.

It will be appreciated that the input video signals VDIN are preprocessed in the input circuit unit 22 and digitized in the analog to digital conversion circuit 23 (FIG. 5A), and the resulting input image data S21 is supplied to one frame delay circuit 81. Delay data SD1 produced by one frame delay circuit 81 is coupled to one frame delay circuit 82 as well as to the first input terminal a of a frame selection circuit 84.

Delay data SD2, which is produced by one frame delay circuit 82, is passed to another one frame delay circuit 83, where it is delayed for one frame and supplied as delay data SD3 to the second input terminal b of the frame selection circuit 84. Thus, the frame order reordering circuit 80 sequentially receives input image data S21 at the timing of each frame, and the first and second input terminals a and b of the frame selection circuit 84 are selected at the timing of the frame pulse FP which is synchronized with the frame rate of the input image data S21, to reorder the frame sequence.

The input image data S21 and the delay data SD1 are supplied to the motion vector detection circuit 85 which produces motion vector data DMV1 and differential data DDR1 by comparing the input image data S21 to the delay data SD1, and this data DMV1 and DDR1 are coupled to the motion compensation unit 26 of FIG. 5A.

Furthermore, the delay data SD2 and SD3 are applied to first and second input terminals a and b of another frame selection circuit 86, and either SD2 or SD3 is selected at the timing of the frame pulse FP and supplied to another motion vector detection circuit 87.

Delay data SD1 also is supplied to the motion vector detection circuit 87, and the resulting motion vector data DMV2 and differential data DDR2 produced by comparing the delay data SD1 and either the delay data SD2 or delay data SD3 are coupled to the motion compensation unit 26.

In the frame order reordering circuit 80, frames are reordered to that needed for the decoding operation in place of the frame order of the input video signals VDIN which is high efficiency coded. This simplifies and makes efficient the control and circuit configuration of the decoding system.

Figure 15:
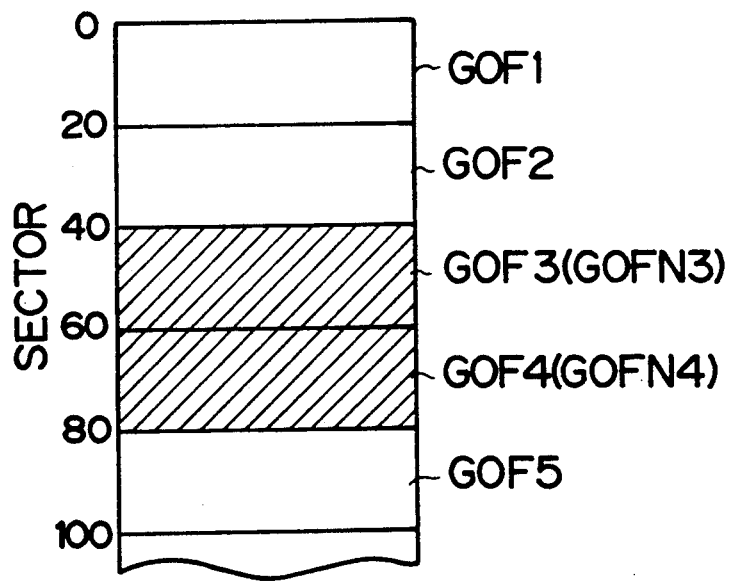
FIG. 15 is a diagrammatic view of a recording region of a CD-MO disk.
Figure 14:
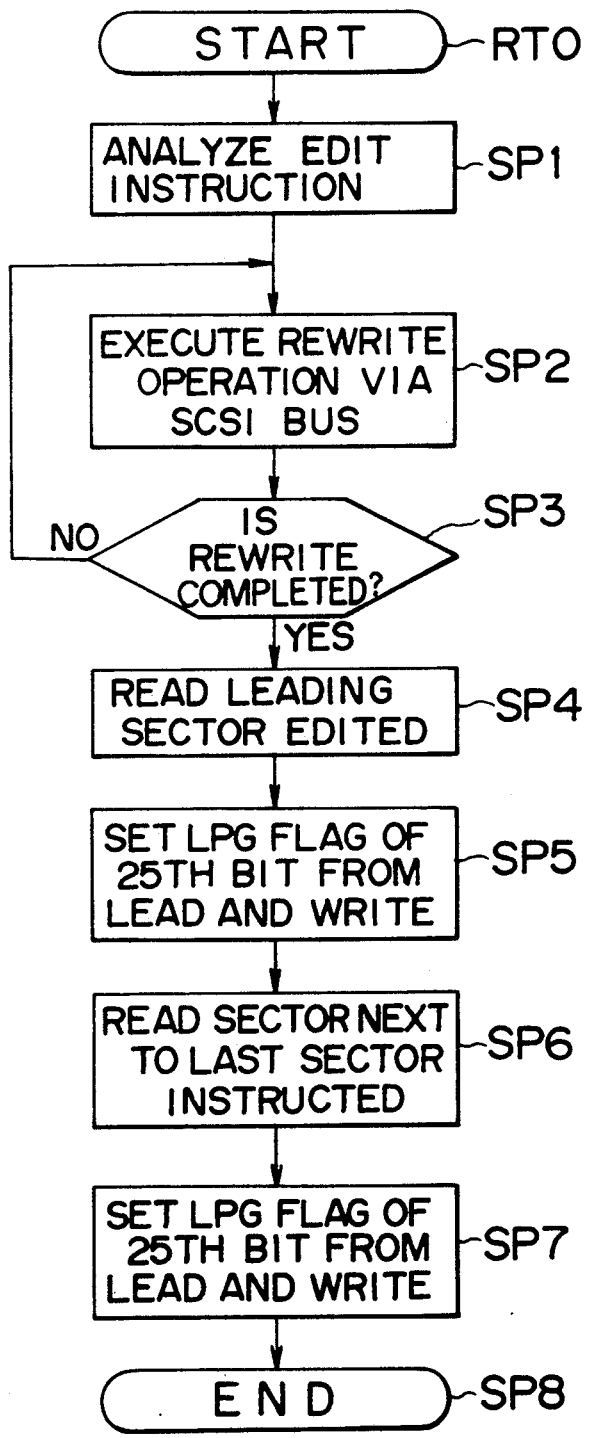
FIG. 14 is a flow chart illustrating an edit routine.

The recording/reproducing controlling circuit 73 of the coded moving picture recording/reproducing system 70 (FIG. 10) executes an edit routine RTO as shown in FIG. 14 in response to an edit instruction externally supplied thereto. The edit routine is adapted to rewrite the coded moving picture data VDREC in units of one group of frames (one GOF). As shown in FIG. 15, the coded moving picture data VDREC is recorded as one group of frames in 20 sectors of a CD-MO disk.

In the input video signals VDIN, the intraframe, interpolated frames and predictive frames are presented in the order or sequence, C0, A1, C2, B3, C4, B5, C6, and B7, and these constitute one group of frames GOF11, GOF12, ... (FIG. 12D). It will be seen that the usual group of frames GOF1, GOF2, ... is formed of a sequence of 8 frames having the order A1, C2, B3, C4, B5, C6, B7, and C8 as shown in FIG. 12C. Consistent with FIG. 4A, an intraframe is designated "A", an interframe is designated "B" and an interpolated frame is designated "C". With the order shown in groups of frames GOF11, GOF12, an error in which a frame that properly belongs in one group of frames GOF11, is included in the other group of frames GOF12, is avoided.

Turning to the routine illustrated in FIG. 14, when the recording/reproducing controlling circuit 73 enters the edit routine RTO it executes step SP1 to analyze the edit instruction. Let it be assumed that the instruction calls for rewriting 40 sectors of the third and the fourth group of frames GOF3 and GOF4 with new coded moving picture data VDRED. Accordingly, the recording/reproducing controlling circuit 73 proceeds to the next step SP2.

In this step SP2, the recording/reproducing controlling circuit 73 supplies a control command to the SCSI control circuit 75 so that rewrite control of the CD-MO disk (i.e. editing) is executed by way of the SCSI bus 74. Thus, input video signals VDIN of two new groups of frames GOF3N and GOF4N are supplied as coded moving picture data VDREC to the CD-MO unit 71 via the moving picture coding/encoding system 21.

Subsequently, the recording/reproducing controlling circuit 73 executes the next step SP3, in which it determines whether or not the rewrite operation is completed. If not, the recording/reproducing controlling circuit 73 returns to the step SP2, where it continues to execute the rewrite operation. When the rewrite operation is eventually completed, the routine proceeds to the step SP4 in which the recording/reproducing controlling circuit 73 reads the leading sector of the newly written coded moving picture data that is, the leading sector of the new group of frames GOF3N that is written onto the CD-MO disk (the fortieth sector in this embodiment shown in FIG. 15).

In the next step SP5, the recording/reproducing controlling circuit 73 sets as the edit flag the link flag (LPG) of the frame group layer shown in FIG. 11A. This link flag LPG is, for example, the 25th bit from the beginning of the sector, and this set edit flag LPG is written on the CD-MO disk.

Subsequently, in the step SP6 the recording/reproducing controlling circuit 73 reads the sector following the last sector that has been edited onto the CD-MO disk (in this example, the 80th sector follows the last sector—i.e., the 79th sector—of the new group of frames GOFN4 that has been rewritten, or edited on the disk).

In the next step, SP7, similar to step SP5 previously described, the recording/reproducing controlling circuit 73 sets as the edit flag the link flag (LPG) of the frame group in the first group of frames GOF5 that immediately follows the edited group of frames (it is seen that GOF5 follows GOFN3 and GOFN4). This link flag LPG is the 25th bit from the beginning of the sector (for example, the 25th bit of sector 80), and it is rewritten on the CD-MO disk of the sector being read (i.e., the 80th sector). In the next step SP8, the edit routine RTO is completed.

The coded moving picture data VDREC which has been edited and recorded on the CD-MO disk as aforedescribed subsequently is read by the recording/reproducing controlling circuit 73, and the resulting coded moving picture data VDPB which is reproduced is supplied to the motion picture coding/encoding system 21.

In the moving picture decoding system 21B of FIG. 6, a frame sequence reverse reordering circuit 90, as illustrated in FIG. 16, is used to reverse the reordering of the frame sequence that had been carried out by the reordering circuit 80 of FIG. 13, thereby permitting a decoding operation and recovery of the original input video signals VDIN. The frame sequence reverse reordering circuit 90 is included in the decoder circuit 57 of FIG. 6. During reproduction, the edit flag set in the link flag (LPG) of the frame group layer is checked to determine if the reproduced group of frames is new or if the reproduced group of frames follows a new GOF. It is recalled that in both cases, the link flag LPG of the edited group of frames (GOFN3) or the old but following group of frames (GOF5) is set.

More specifically, the inverse transform coded data S54 received from the inverse transform coding circuit 56 is supplied directly to a first input terminal A of a selector circuit 91 of the decoder circuit 57, and the inverse transform coded data S54 also is supplied to a second input B through a frame memory 92 having a delay equal to 2 frames.

The selector circuit 91 and the frame memory 92 operate at the timing of frame pulse FP, and thereby return the frame order of the decoded video signals from that shown in FIG. 12B to the frame order of the original input video signals VDIN shown in FIG. 12A.

Edit flag signals SLPG which correspond to the edit flag set in the link flag (LPG) of the header data HD12 (from FIG. 6 it is seen that header data HD12 is derived by the inverse quantization circuit 55) are coupled to the selector circuit 91, and only when the edit flag LPG is set is the selecting operation discontinued and a frame which is supplied after this set edit flag is provided as an output without any change. Thus, frame data in an old group of frames, such as GOF1, GOF2, GOF5 . . . is not mixed into or used to decode frame data such as an interpolated frame in a new group of frames, such as edited GOFN3 and GOFN4. Consequently, interference is not produced in the reproduced image.

If the edit flag is set in the group of frames GOF12 shown in FIG. 12D, the intraframe signal A9 is repeated in place of the interpolated frame C8 because the interpolated frame is derived from the preceding group of frames (FIG. 12A) which is not related to GOF12 because, as assumed, GOF12 is an edited, new group of frames whose data is independent of, and thus not linked to, the preceding group of frames recovered from the CD-MO disk.

In performing an edit operation on recorded, coded moving picture data for each group of frames, the edit flag in the groups of frames that are edited and in the groups of frames immediately following the edited group is set to the link flag LPG and interpolation of the interpolated frames is carried out if the reproduced edit flags are not set. Thus, editing of recorded coded moving picture data may be carried out readily and with good quality of the edited image.

In the edit operation previously described, the edit flag is set to the link flag (LPG) both in the groups of frames that are edited (or added) and in the groups of frames that immediately follow the edit group. However, if the recording/reproducing controlling circuit 73 of FIG. 10 stores the edited group of frames, good edit operations can be performed merely by setting the edit flag to the link flag (LPG) of the group of frames that immediately follows the edit group of frames.

In addition, during a recording (or during a coding) operation, consecutive numbers, which may start from an arbitrary number generated in the recording/reproducing controlling circuit 73, may be added to the frame numbers (TR) in the picture layer (FIG. 11B), and signals similar to the edit flag signals SLPG may be generated when an incontinuity in the frame number (TR) is detected during a reproducing operation when one or more groups of frames have been edited to cause such incontinuity. One example of an incontinuity detection circuit is shown in FIG. 17. Here, incontinuity detection circuit 95 is connected upstream of the frame sequence reverse reordering circuit 90 of FIG. 16, and the frame number (TR) of the picture layer contained in the inverse transform coded data S54 is coupled to a comparison circuit 96 and to a latch circuit 97.

This latch circuit 97 latches the frame number (TR) at the timing of the frame pulse FP, and consequently, the frame number (TR) is supplied to an adder circuit 98 with a delay of one frame. The adder is adapted to add the value "1" to the frame number (TR) and the thus incremented frame number is coupled to the comparison circuit 96 as a comparison frame number CTR.

The comparison circuit 96 compares the frame number (TR) with the comparison frame number CTR, and generates an inconsistency detection signal at a high logic level "H" when the compared values are not equal to each other. The comparison circuit 96 applies this detection signal to an AND circuit 99.

A leading frame group signal GOFF having a high logic level "H" is inverted by an inversion circuit 100 and then applied to the AND circuit 99. The inconsistency detection signal normally is at a low logic level "L" when the leading frame group is reproduced. However, in the other operations, the edit flag signal SLPG is produced by the AND circuit 99 and exhibits a logic level determined by the inconsistency detection signal. This flag signal SLPG is supplied from the AND circuit to the selector circuit 91 of the frame sequence reverse reordering circuit 90.

As previously described, edited groups of frames are discriminated by using edit flags (LPG) and frame numbers (TR). Interpolated frames in each group of frames may be satisfactorily decoded by interpolating each interpolated frame C of each frame group, using only the intraframe coded signal A and the predictive frame coded signals B in the frame group.

As described above, the normal frame sequence of the input video signal VDIN is comprised of intraframes A, predicted frames B and interpolated frames C arranged as shown in FIG. 12A. The frame arrangement of the coded moving picture data is not limited to this sequence; and FIGS. 18A and 19A illustrate other known input video frame sequences in which the frames are reordered as shown in FIGS. 18A and 19B to facilitate decoding of the reproduced video signals VDPB.

Figures 18A, 18B, 18C, 18D:
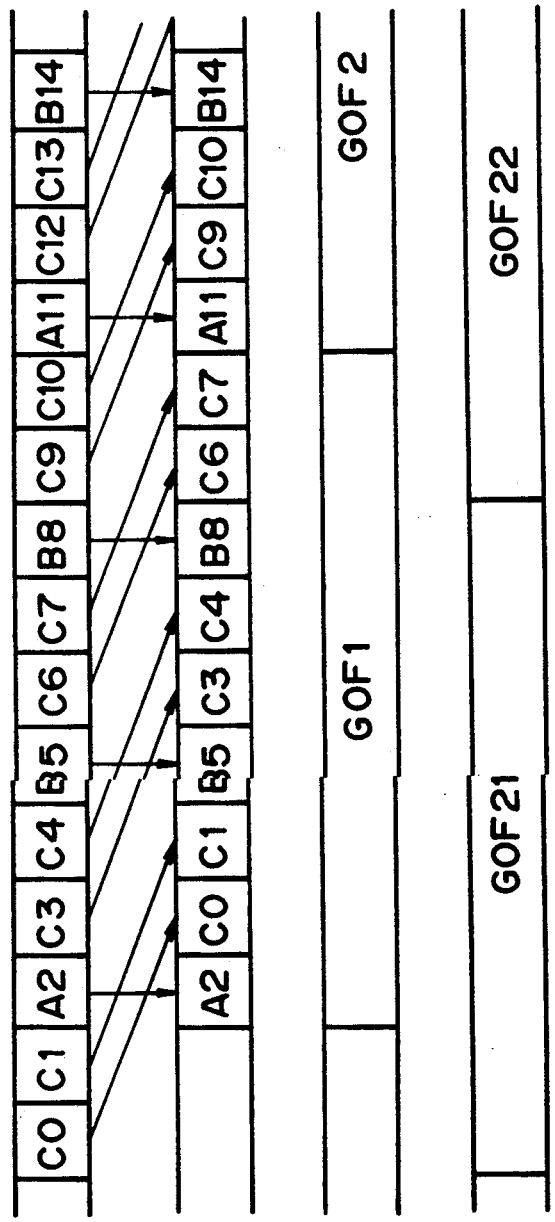

Here the groups of frames may be arranged as GOF21, GOF22 . . . as shown in FIG. 18D and GOF31, GOF32 . . . as shown in FIG. 19D in place of the arrangments GOF1 GOF2 . . . shown in FIGS. 18C and 19C. Nevertheless, similar effects may be achieved when performing edit operations as have been described above.

Although video signals have been described as being high efficiency coded and then recorded on a CD-MO disk, the recording medium is not limited to this. The present invention may be suitably applied to other recording media, such as an optical disk, magnetic disk and magnetic tape. Furthermore, the us of such high efficiency coded video signals is not limited solely to recording. Such signals may be transmitted.

While preferred embodiments of the invention have been described, it will be obvious to those skilled in the art that various changes and modifications may be made therein without departing from the invention, and it is intended that the appended claims cover all such changes and modifications as fall within the true spirit and scope of the invention.

What is claimed is:

1. A method of editing coded moving picture data, in which successive frames of video signals are selectively intraframe coded or interframe coded and quantized to provide coded moving picture data, and said coded moving picture data is arranged in groups of frames with each group including a first number of intraframe coded signals and a second number of intraframe coded signals and each group being recorded on a predetermined recording medium said method comprising editing at least one group of frames and setting an edit flag in the at least one group of edited frames.

2. A method of editing coded moving picture data, in which successive frames of video signals are selectively intraframe coded or interframe coded and quantized to provide coded moving picture data, and said coded moving picture data is arranged in groups of frames with each group including a first number of intraframe coded signals and a second number of interframe coded signals and each group being recorded on a predetermined recording medium with a respective, sequential frame number said method comprising editing a new group of frames with new coded moving picture data on said recording medium, and providing said new group of frames with a new frame number different from the sequence of frame numbers previously recorded.

3. The method of claim 1 further comprising the step of setting an edit flag in the group of frames which immediately follows the edited group of frames.

4. The method of claim 1 wherein a group of frames additionally includes interpolated frame signals representing a video image frame and derived from preceding and following video image frames, respectively, at least one of said interpolated frame signals in a group of frames being derived from a video image frame represented by coded signals included in a preceding group of frames; and wherein the step of editing comprises inserting into recorded groups of frames a new group of frames which includes an interpolated frame signal that is derived from a video image frame that differs from all of the video image frames represented by the coded signals included in a recorded preceding group of frames.

5. The method of claim 4 wherein the step of inserting a new group of frames comprises replacing at least one previously recorded group of frames with at least one new group of frames.

6. The method of claim 4 wherein the step of inserting a new group of frames comprises adding at least one new group of frames immediately following a previously recorded group of frames.

7. The method of claim 1 wherein each group of frames includes a frame number signal and previously recorded groups of frames include frame number signals representing successive numbers, and wherein the step of editing comprises providing a frame number signal to an edited group of frames which represents a number that is not successive to the preceding, previously recorded group of frames.

8. The method of claim 7 wherein the step of setting an edit flag comprises detecting the frame number signal of a recorded group of frames; incrementing the number represented by the detected frame number signal; detecting the frame number signal of the immediately following group of frames; comparing the incremented number to the number represented by the frame number signal detected from said immediately following group of frames; and setting the edit flag in said immediately following group of frames if the compared numbers differ.

9. A method of editing coded moving picture data, in which successive frames of video signals are selectively intraframe coded or interframe coded and quantized to provide coded moving picture data, and said coded moving picture data is arranged in groups of frames with each group including a first number of intraframe coded signals and a second number of interframe coded signals and each group being recorded on a predetermined recording medium, said method comprising editing at least one of the recorded groups of frames, and setting an edit flag in at least the first group of frames which immediately follows the edited group of frames.

10. A method of editing video signals in which successive video image frames are selectively intraframe, interframe or interpolated coded to compress the data therein and a predetermined number of coded video image frames are included in a group of frames, an interpolated frame being derived from adjacent, preceding and following frames, and successive coded video image frames being reordered in a recorded group of frames such that at least one interpolated frame therein is derived from a coded video image frame in a preceding recorded group of frames, said method comprising the steps of editing at least one group of frames by rewriting said at least one group with a corresponding number of new groups; setting an edit flag in at least the first of the new groups of frames; and setting an edit flag in the unedited group of frames which immediately follows the new group; whereby said edit flag indicates that an interpolated frame in the group of frames is not derived from a coded video image frame in the preceding group of frames.

* * * * *